(12) United States Patent
Chen

(10) Patent No.: US 12,481,210 B2
(45) Date of Patent: Nov. 25, 2025

(54) FIELD SEQUENTIAL SINGLE LCD PROJECTOR AND PROJECTION METHOD

(71) Applicant: Changsha Pujiade Photoelectric Technology Co., Ltd, Hunan (CN)

(72) Inventor: Ling Chen, Hunan (CN)

(73) Assignee: Changsha Pujiade Photoelectric Technology Co., Ltd, Changsha (CN)

( * ) Notice: Subject to any disclaimer, the term of this patent is extended or adjusted under 35 U.S.C. 154(b) by 321 days.

(21) Appl. No.: 18/072,431

(22) Filed: Nov. 30, 2022

(65) Prior Publication Data

US 2023/0314925 A1     Oct. 5, 2023

(30) Foreign Application Priority Data

Apr. 5, 2022   (CN) .......................... 202210352540.0

(51) Int. Cl.
*G03B 33/08*     (2006.01)
*G03B 21/00*     (2006.01)
*G03B 21/20*     (2006.01)

(52) U.S. Cl.
CPC ........... *G03B 33/08* (2013.01); *G03B 21/006* (2013.01); *G03B 21/2013* (2013.01); *G03B 21/2033* (2013.01); *G03B 21/208* (2013.01)

(58) Field of Classification Search
CPC .. G03B 33/08; G03B 21/066; G03B 21/2013; G03B 21/2033; G03B 21/208
USPC ......................................................... 353/31
See application file for complete search history.

(56) References Cited

U.S. PATENT DOCUMENTS

| | | | |
|---|---|---|---|
| 7,570,404 B2 * | 8/2009 | Li ............................ | G02B 5/32 |
| | | | 359/267 |
| 10,819,961 B2 * | 10/2020 | Tanaka ............... | G02B 27/0933 |
| 2020/0341353 A1 * | 10/2020 | Guo ..................... | G03B 21/142 |

FOREIGN PATENT DOCUMENTS

| WO | WO-2011024442 A1 * | 3/2011 | ......... G03B 21/2006 |
|---|---|---|---|
| WO | WO-2013114665 A1 * | 8/2013 | ......... G02B 19/0014 |

OTHER PUBLICATIONS

Translation of WO_2011024442_A1 (Year: 2025).*
Translation of WO_2013114665_A1 (Year: 2025).*

* cited by examiner

*Primary Examiner* — Jerry L Brooks

(57) ABSTRACT

The disclosure provides a new field sequential single LCD projector, includes an LED light source, a collecting and collimating device, a light-combining and color-filtering device, an intermediate reflector, a focusing device, a light-homogenizing device, an outgoing lens, a LCD light valve, a field lens, an imaging reflector and a projection lens which are arranged in sequence according to the light traveling direction. The LED light source includes a red light source, a green light source and a blue light source. Compared with the existing full-color light valve technology, under the same technical condition, the efficiency of the light valve is greatly improved, the power of the light source is greatly reduced, and the image color gamut is greatly improved, so that the projector can output higher brightness and has vast market adaptability.

10 Claims, 7 Drawing Sheets

FIELD SEQUENTIAL SINGLE LCD PROJECTOR AND PROJECTION METHOD

CROSS-REFERENCE TO RELATED APPLICATION

Priority is claimed from China Patent Application No. CN202210352540.0 filed on Apr. 5, 2022, which is hereby incorporated by reference.

TECHNICAL FIELD

The present disclosure relates to the field of projector, and in particular, to a new field sequential single LCD projector and projection method.

BACKGROUND

The pure field sequential single LCD projector has many advantages such as simple structure, low energy consumption, high output brightness, and wide color gamut, and theoretically can be comparable to the efficiency and effect of 3LCD and DLP projectors. For decades, people have been trying to try but haven't got any substantive achievement, that is, have failed to make a product and put it on the market to generate value.

The main reasons: First, the bandwidth requirement of the driver IC is too high, which exceeds the manufacturing level of the past and the current stage or the price performance expectation that consumers can afford, second, the response speed requirement to the liquid crystal is too high, and it is difficult to ideally realize productization, the third is that the technical side underestimated the user' choosiness degree on the product, such as smearing, cross color, ghosting and other serious deficiencies, the user simply cannot accept it, even if the brightness indeed becomes higher, and the power consumption indeed becomes much lower.

In fact, it is because the technology required for the pure field sequence (R, G, B fields ideally input in sequence without interval) lags behind the results of market development. For example, in 2004, the resolution of the mainstream single LCD projector was 320*240, and now it is FHD. Now there is no problem with technology (and ensuring low price and high quality) in making a 320*240 pure field sequential projector, but it is very difficult to make a FHD pure field sequential projector now, and there is no market demand for making a 320*240 pure field sequential projector.

Therefore, it is necessary to find a feasible entry point between technology and market, and solve the above-mentioned contradiction between technology and market, this is the purpose of the new field sequential single LCD projector of the present disclosure, the present disclosure can fit the market demand of the current FHD resolution, also has the characteristics of the pure field sequential single LCD projector, such as high efficiency light valve, low power consumption, wide image gamut and high output brightness, is mainly realized by significantly reducing the bandwidth requirements of the driver IC, significantly reducing the response time to the liquid crystal, and improving the full-color LCD aperture ratio of the light valve, significantly reducing the engineering difficulty and R&D investment of productization, and significantly reducing the raw material cost of products.

SUMMARY

The purpose of the present disclosure is to overcome the deficiencies of the prior art and provide a new field sequential single LCD projector, the present disclosure has the characteristics of pure field sequential single LCD projector, such as high efficiency light valve, low power consumption, wide image gamut and high output brightness, etc.

In order to achieve the above purpose, the present disclosure provides a new field sequential single LCD projector, which comprises an LED light source, a collecting and collimating device, a light-combining and color-filtering device, an intermediate reflector, a focusing device, a light-homogenizing device, an outgoing lens, a LCD light valve, a field lens, a imaging lens and a projection lens arranged in sequence according to the direction of light traveling.

The LED light source comprises a red light source, a green light source and a blue light source; the collecting and collimating device comprises a red light collecting and collimating module for collecting and collimating the light emitted by the red light source, the green light collecting and collimation module for collecting and collimating the light emitted by the green light source, and the blue light collecting and collimating module for collecting and collimating the light emitted by the blue light source; the red light collecting and collimating module, the green light collecting and collimating module, and the blue light collecting and collimating module all comprise at least one lens.

The light-combining and color-filtering device combines light and filters color for the light emitted by the red light collecting and collimating module, the green light collecting and collimating module, and the blue light collecting and collimating module; the focusing device focuses the image of the LED light source on the incident end face of the light-homogenizing device to form a real image of the secondary light source, the focusing device comprises at least one lens; after the light-homogenizing device homogenizes the light of the real image of the secondary light source, the outgoing lens uniformly illuminates the LCD light valve.

Further, the LCD light valve is a half-field sequential display light valve with a single base-color color filter, and any pixel of the LCD light valve comprises two sub-pixels, which are respectively the first sub-pixel and the second sub-pixel; correspondingly, each frame of the full-color image inputting the LCD light valve is decomposed into three-base color sub-frame images: red sub-frame, green sub-frame and blue sub-frame.

The first sub-pixel is provided with a single-base color color filter, and displays one of three-base color sub-frame images with the same color as the color filter.

The second sub-pixel does not have a color filter, and alternately displays the other two three-base color sub-frame images by means of field sequence.

Correspondingly, one of the LED light sources corresponding to the color of the color filter of the first sub-pixel, is selectively lit with a duty cycle.

Correspondingly, when the second sub-pixel displays one of the other two sub-frame images by means of field sequence, one of the LED light sources corresponding the color, is selectively lit with a duty cycle.

Correspondingly, when the second sub-pixel displays the other one of the other two sub-frame images by means of field sequence, one of the LED light sources corresponding the color, is selectively lit with a duty cycle.

Further, let the time-consuming displaying each frame of full-color image be T, and T is divided into a first time period $t_1-t_0$, a second time period $t_2-t_1$, a third time period $t_3-t_2$ and a fourth time period $t_4-t_3$, then $T=(t_1-t_0)+(t_2-t_1)+(t_3-t_2)+(t_4-t_3)=t_4-t_0$; correspondingly, the first sub-pixel displays one sub-frame images at the time T, the second sub-pixel alternately displays the other two sub-frame images by means of field sequence within the time T, respectively: the first time period t1−t0 is to insert a black field for the second sub-pixel, the second time period t2−t1 is to display one of the other two sub-frame images for the second sub-pixel, the third time period t3−t2 is to insert a black field for the second sub-pixel, and the fourth time period t4−t3 is to display the other one of the other two sub-frame images for the second sub-pixel.

Correspondingly, one of the LED light sources corresponding to the color of the color filter of the first sub-pixel, is selected to be correspondingly lit within the first time period t1−t0 and the third time period t3−t2.

Correspondingly, when the second sub-pixel displays one of the other two-base color sub-frame images at the second time period t2−t1, one of the LED light sources corresponding to the color of one sub-frame image, is selected within the second time period t2−t1, to be lit at the time ≤t2−t1.

Correspondingly, when the second sub-pixel displays the other one of the other two sub-frame images at the fourth time period t4−t3, one of the LED light sources corresponding to the color of the other sub-frame image, is selected within the fourth time period t4−t3, to be lit at the time ≤t4−t3.

Further, the LCD light valve is a black and white type of half-field sequential display light valve, and any pixel of the LCD light valve comprises two black and white sub-pixels, which are respectively the first sub-pixel and the second sub-pixel; correspondingly, each frame of the full-color image inputting the LCD light valve is decomposed into three-base sub-frame images: red sub-frame, green sub-frame and blue sub-frame; let the time-consuming displaying each frame of the full-color image be T:

The first sub-pixel selectively displays one of three-base color sub-frame images within the T.

Correspondingly, the second sub-pixel alternately displays the other two of three-base color sub-frame images by means of field sequence within the T.

Correspondingly, one of the LED light sources corresponding to the color of one sub-frame image displayed by the first sub-pixel, is selectively lit with a duty cycle.

Correspondingly, when the second sub-pixel displays one of the other two sub-frame images by means of field sequence, the light source of the LED light sources corresponding to the color of one sub-frame image, is selectively lit with a duty circle.

Correspondingly, when the second sub-pixel displays the other one of the other two sub-frame images by means of field sequence, the light source of the LED light sources corresponding to the color of the other sub-frame image, is selectively lit with a duty cycle.

Further, let T be divided into a first time period t1−t0, a second time period t2−t1, a third time period t3−t2 and a fourth time period t4−t3, then T=(t1−t0)+(t2−t1)+(t3−t2)+(t4−t3)=t4−t0.

Correspondingly, the first sub-pixel displays one of three-base color sub-frame images at the first time period t1−t0 and the third time period t3−t2, and inserts into a black field at the second time period t2−t1 and the fourth time period t4−t3.

Correspondingly, the second sub-pixel alternately displays the other two-base color sub-frame images by means of field sequence within the T, respectively: the first time period t1−t0 is to insert a black field for the second sub-pixel, the second time period t2−t1 is to display one of the other two-base color sub-frame images for the second sub-pixel, the third time period t3−t2 is to insert a black field for the second sub-pixel, the four time period t4−t3 is to display the other one of the other two-base color sub-frame images for the second sub-pixel.

Correspondingly, one of the LED light sources corresponding to the color of a one-base color sub-frame image displayed by the first sub-pixel, is selected within the first time period t1−t0 and the third time period t3−t2, to be correspondingly lit at the time ≤t1−t0 and ≤t2−t2.

Correspondingly, when the second sub-pixel displays one of the other two-base color sub-frame images at the second time period t2−t1, one of the LED light sources corresponding to the color of one sub-frame image, is selected at the second time period t2−t1, to be lit at the time ≤t2−t1.

Correspondingly, when the second sub-pixel displays the other one of the other two-base color sub-frame images at the fourth time period t4−t3, one of the LED light sources corresponding to the color of the other sub-frame image, is selected within the fourth time period t4−t3, to be lit at the time ≤t4−t3.

Further, the light-combining and color-filtering device comprises a BG dichroic plate and a CR dichroic plate.

The light-emitting surfaces of the green light source and the blue light source are not parallel and not coplanar with each other; the BG dichroic plate is located between the light-emitting surfaces of the green light source and the blue light source, and combines the light of the green light source and the blue light source.

The light-emitting surfaces of the red light source and the green light source are parallel, coplanar, non-parallel or non-coplanar with each other; the CR dichroic plate combines the light of BG dichroic plate and the red light source.

Further, the light emitted by the light-combining and color-filtering device has: the spectral spectra of red, green and blue light do not overlap with each other, and the light-combining and color-filtering device outputs pure three-base color light; the spectra overlapping with each other is filtered and blocked by the light-combining and color-filtering device.

Further, the light emitted by the light-combining and color-filtering device has: the wavelength range that the spectral spectra of red, green and blue light overlap with each other≤50 nm, and the area of the region overlapping with each other≤5% of the spectra enclosing area of the light emitted by the light-combining and color-filtering device; the wavelength of the spectra overlapping with each other>50 nm, the area of the regions overlapping with each other>5% of the spectra enclosing area of the light emitted by the light-combining and color-filtering device, are filtered and blocked by the light-combining and color-filtering device.

Further, the red light collecting and collimating module comprises an R collecting lens and an R collimating lens arranged in sequence according to the direction of light traveling; the green light collecting and collimating module comprises a G collecting lens and G collimating lens arranged in sequence according to the direction of light traveling; the blue light collecting and collimating module comprises a B collecting lens and a B collimating lens arranged in sequence according to the direction of light traveling.

Preferably, the light-homogenizing device comprises a square-cone concentrator.

Preferably, the outgoing lens comprises at least one lens, and the lens adopts a plano-convex free-form surface lens, the plane of the free-form surface lens is an incident surface, and the outgoing surface of the free-form surface lens is a free-form surface.

The present disclosure also provides a projection method of the new field sequential single LCD projector, comprising the following steps:

The red light source, the green light source and the blue light source emit light respectively, the red light collecting and collimating module collects and collimates the light emitted by the red light source, and the green light collecting and collimating module collects and collimates the light emitted by the green light source, and the blue light collecting and collimating module collects and collimates the light emitted by the blue light source.

The light-combining and color-filtering device combines and filters the light emitted by the red light collecting and collimating module, the green light collecting and collimating module, and the blue light collecting and collimating module, and then, after being reflected by the intermediate reflector and focused by the focusing device in sequence, the image of the LED light source is focused on the incident end face of the light-homogenizing device, thereby forming a real image of the secondary light source; after the light of the real image of the secondary light source is homogenized by the light-homogenizing device, the LCD light valve is evenly illuminated by the outgoing lens, after passing through the LCD light valve, the light is projected out through the field lens, imaging reflector and projection lens in sequence.

The first sub-pixel of the LCD light valve displays one of three-base color sub-frame images; correspondingly, one of the LED light source corresponding to the color of one sub-frame image displayed by the first sub-pixel, is selectively lit with a duty cycle.

The second sub-pixel alternately displays the other two-base color sub-frame images by means of field sequence, correspondingly, the two light sources of the LED light sources corresponding to the colors of the other two sub-frame images, and the two sub-frame images alternately displayed by the second sub-pixel correspond to alternate synchronously, are selectively lit with a duty cycle.

Further, the ratio δ of the area occupied by the first sub-pixel and the second sub-pixel in any one pixel is:

$$\delta = S_{81}/S_{82};$$

$$\delta = f(\Phi_{81}, \Phi_{821}, \Phi_{822});$$

wherein: $S_{81}$ is the area of the first sub-pixel; $S_{82}$ is the area of the second sub-pixel; $\Phi_{81}$ is the luminous flux provided for the first sub-pixel; $\Phi_{821}$ is the luminous flux provided when the second sub-pixel displays one sub-frame image with the other two-base color by means of field sequence; $\Phi_{822}$ is the luminous flux provided when the second sub-pixel displays the other one sub-frame image with the other two-base color by means of field sequence.

Further, the $\Phi_{81}$, $\Phi_{821}$, $\Phi_{822}$, the relationship between the time-consuming T of each frame of full-color image and the optoelectronic characteristics of the LED light source is as follows:

$$\Phi_{81} = f\{[\beta(\Phi_R, \Phi_G, \Phi_B)], \Delta t_a, \Delta t_c\};$$

$$\Phi_{821} = f\{[\beta(\Phi_R, \Phi_G, \Phi_B)], \Delta t_b\};$$

$$\Phi_{822} = f\{[(\beta(\Phi_R, \Phi_G, \Phi_B)], \Delta t_d\};$$

wherein: β represents the mathematical meaning of "belonging to one of them" or "the corresponding one of them", that is, only calculating the photoelectric characteristics of one light source corresponding to the color displayed by the first sub-pixel 81 in the $\Phi_R$, $\Phi_G$, $\Phi_B$; $\Phi_R$ is the photoelectric characteristic of the red light source; $\Phi_G$ is the photoelectric characteristic of the green light source; $\Phi_B$ is the photoelectric characteristic of the blue light source; $\Delta t_a$ is related to the first time period t1−t0, that is, the proportion or duty cycle at the first time period t1−t0; $\Delta t_b$ is related to the second time period t2−t1, that is, the proportion or duty cycle at the second time period t2−t1; $\Delta t_c$ is related to the third time period t3−t2, that is, the proportion or duty cycle at the third time period t3−t2; $\Delta t_d$ is related to the fourth time period t4−t3, that is, the proportion or duty cycle at the fourth time period t4−t3.

Beneficial Effects of the Present Disclosure

Compared with the existing full-color light valve, under the same technical condition, the present disclosure greatly improves the efficiency of the light valve, greatly reduces the power of the light source, and greatly improves the color gamut of the image, so that the projector can output higher brightness and has wider market adaptability. Meanwhile, compared with the pure field sequential LCD light valve technology, the present disclosure can significantly reduce the bandwidth requirement of the driver IC, can significantly reduce the response time to the liquid crystal, can significantly reduce the engineering difficulty and R&D investment of productization, and can significantly reduce the raw material cost of the products.

BRIEF DESCRIPTION OF THE DRAWINGS

In order to explain the embodiments of the present disclosure or the technical solution in the prior art more clearly, the following briefly introduces the drawings that need to be used in the description of the embodiments or the prior art, obviously, the drawings in the following description are only some embodiments of the present disclosure, for the ordinary technician in the art, other drawings can also be obtained according to these drawings without creative efforts.

Figure 1:
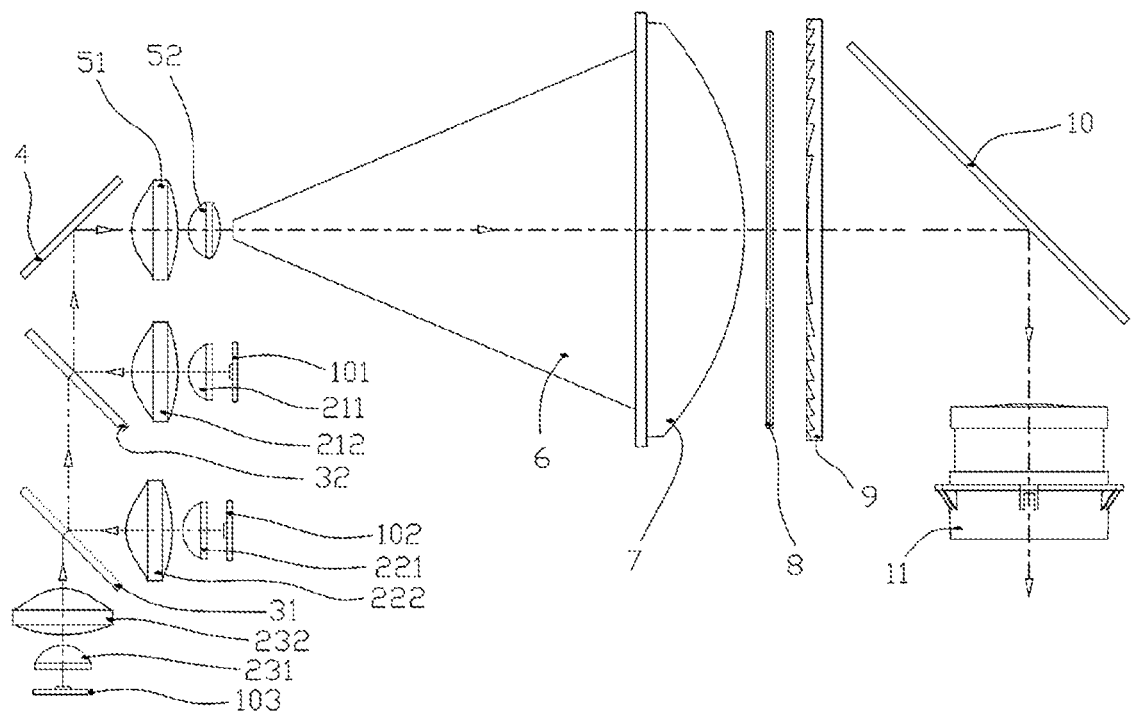
FIG. 1 is a schematic diagram of an embodiment of the present disclosure.
Figure 2:
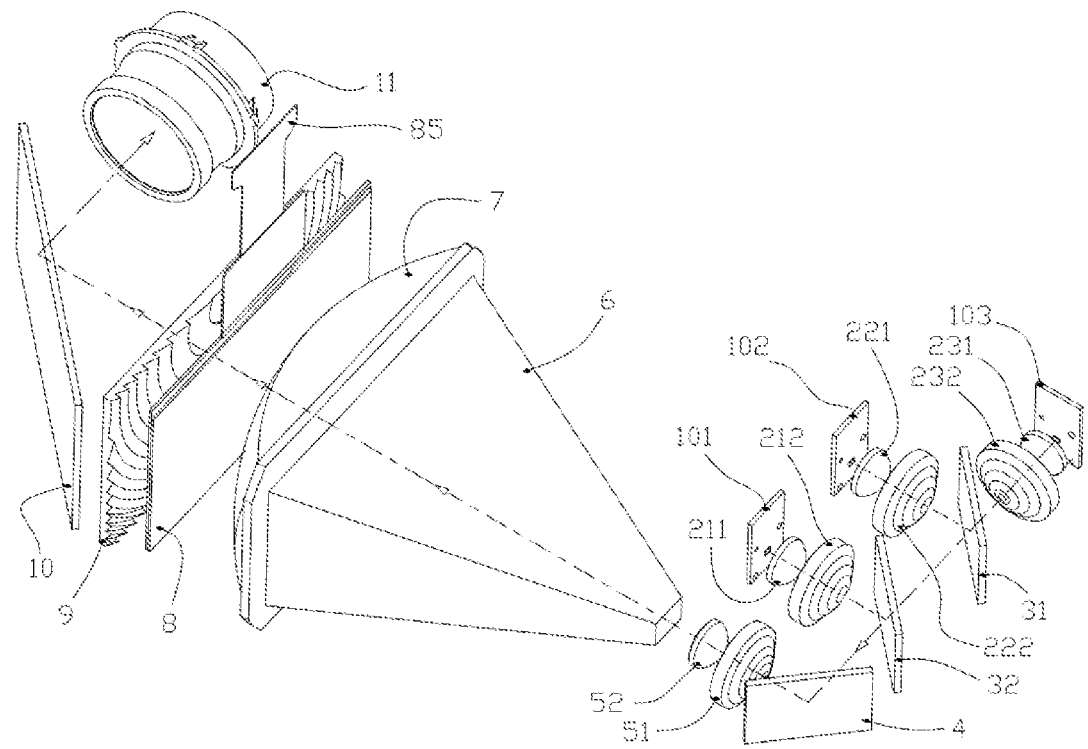
FIG. 2 is a 3D display diagram for FIG. 1.

The description of the above-mentioned drawings reference:

101: red light source; 102: green light source; 103: blue light source; 211: R collecting lens; 212: R collimating lens; 221: G collecting lens; 222: G collimating lens; 231: B collecting lens; 232: B collimating lens; 31: BG dichroic plate; 32: CR dichroic plate; 4: intermediate reflector; 51: first lens; 52: second lens; 6: light-homogenizing device; 7:

outgoing lens; 8: LCD light valve; 81: first sub-pixel; 82: second sub-pixel; 84: BM; 85: FPC cable; 801: any pixel: 9: field lens; 10: imaging reflector; 11: projection lens.

DETAILED DESCRIPTION

In order to make the technician skilled in the art better understand the technical solutions of the present disclosure, the present disclosure will be described in detail below with reference to the drawings, the description in this part is only exemplary and explanatory, and should not have any limiting effect on the protection scope of the present disclosure.

It should be noted that similar reference numerals and letters refer to similar items in the following drawings, so once an item is defined in one drawing, it does not require further definition and explanation in subsequent drawings.

It should be noted that the orientation or positional relationship indicated by the terms of "center", "upper", "lower", "left", "right", "vertical", "horizontal", "inner", "outer", etc., indicate the orientation or positional relationship based on the orientation or positional relationship shown in the drawings, or the orientation or positional relationship that the product of the disclosure is usually placed in use, it is only for the convenience of describing the present disclosure and simplifying the description, rather than indicating or implying that the indicated device or element must have a specific orientation, be constructed and operates in a specific orientation, therefore should not be construed as a limitation of the present disclosure. Furthermore, the terms of "first", "second", "third", etc., are only used to differentiate the description and should not be construed as indicating or implying relative importance.

Furthermore, the terms of "horizontal", "vertical", "overhanging" etc., do not imply that a component is required to be absolutely horizontal or overhanging, but can be slightly inclined. For example, "horizontal" only means that its direction is more horizontal than "vertical", it does not mean that the structure must be completely horizontal, but can be slightly inclined.

In the description of the present disclosure, it should also be noted that, unless otherwise expressly specified and limited, the terms of "arrange", "install", "connect" and "interface" should be understood in a broad sense, for example, it may be a fixed connection, it can also be a detachable connection, or an integral connection; it can be a mechanical connection or an electrical connection; it can be a direct connection, or an indirect connection through an intermediate medium, or the internal communication between the two components. For the ordinary technician in the art, the specific meanings of the above-mentioned terms in the present disclosure can be understood in specific situations.

Embodiment 1

Since the single LCD projector displayed by field sequence is deeply involved in many disciplines and technical applications such as physics, chemistry, material, color engineering, driving circuit, etc., this embodiment first introduces necessary background.

Since 2004, people have been making continuous efforts, referring to Chinese Patent Publication No. CN1645250A, CN102063001A and CN110687737A, etc., that is, similar to a monolithic DLP projector, displaying the red, green and blue, three monochromatic field (sub-frame) images of a frame of full-color image (or image, the same below) by means of time sequence, is used to synthesize color images in the human brain by using human's visual retention effect. Due to the lack of obvious breakthrough on the response speed to LCD light valve in the past (every tens of milliseconds or even sub-seconds), the lack of driver chip resource, and people's cognition has some deficiencies and misunderstandings for field sequence, so this type of display technology, research and development and the engineering difficulty are particularly large, which lead to the fact that it has not been practical. In recent years, the LCD light valve technology has made great progress, especially the relative cheapness of high-bandwidth driver chips has rapidly promoted the practical progress of the field sequential technology projection products.

At the end of the last century, foreign companies such as Philips, JVC (Victor Company of Japan, Limited) and other companies have launched field sequential single LCD rear-projection products, but even today, the difficulty of making their products is very difficult, because multiple prisms are required to rotate precisely at high speed, so it was discontinued after a short try. According to public knowledge, people's research on field sequential display first appeared in 1950 for the color improvement of black-and-white camera and CRT TV, until the popularization of solid-state light source such as LED, the field sequential display technology switches the corresponding color of the lighting sources, usually achieved by mechanical means (such as the color wheel of a DLP projector). This can hardly achieve miniaturization and simplification, and completely violates the theoretical characteristics of simple fabrication and low cost of the field sequential display. The earlier patented technologies available for reference, such as the embryonic field sequence technology in Japanese Patent No. 2519429, have laid a feasible foundation for the subsequent research and development of LCD field sequential display.

The black frame insertion technology introduced in the present disclosure is one of the emergency methods for the LCD display technology with many disadvantages in the early stage to quickly achieve or approach the display effect of CRT (Cathode Ray Tube). With the advancement of LCD technology itself, the black frame insertion technology has faded out with the elimination of CRT.

For example, the refresh rate of an LCD monitor is 60 Hz, by increasing the refresh rate to 120 Hz or decreasing it to 30 Hz, a frame of black field is inserted between the full-color frames to significantly improve the color illusion and smearing of human eye, and other bad feelings.

Through practice, the black frame insertion technology can effectively improve many defects of the field sequence display at the current stage, but its shortcoming is that it affects the output brightness (luminous flux), so people do not think it is a preferred technology, and it is ignored for a long time. People are more inclined to use OCB (optical self-compensating bending) and other technologies to organically combine the field sequence principle, to achieve high-quality field sequence. In recent years, great progress has been made in technologies and processes such as the driving electric field method, liquid crystal cassette thickness, dielectric coefficient, viscosity, elasticity, better anisotropy, liquid crystal injection and orientation, etc., due to the high market expectations, the field sequence display of advanced concepts has hardly been practical for a long time in the past.

For the improvement of projector output brightness, or the effective reduction of input energy (more economical), even if it is only negligible improvement of 1%, the industry should pay attention to it, and it is worthy of active implementation.

The field sequential display method provided by the present disclosure, obviously, can significantly reduce the energy consumption of the full-color single LCD projector, and has practical significance in terms of heat dissipation, raw material cost, noise, contrast, black level and especially energy saving. Meanwhile, compared with the practical black frame insertion of the ideal pure field sequential technology, the present disclosure can significantly reduce the bandwidth requirement of the driver IC (or circuit) and the response time to the liquid crystal, can reduce the engineering difficulty and R&D investment of productization, and can reduce the raw material cost for products.

Referring to FIG. 1-4, a new field sequential single LCD projector provided in this embodiment comprises an LED light source, a collecting and collimating device, a light-combining and color-filtering device, an intermediate reflector 4, a focusing device 5, a light-homogenizing device 6, an outgoing lens 7, a LCD light valve 8, a field lens 9, an imaging reflector 10 and a projection lens 11 arranged in sequence according to the direction of light traveling.

The LED light source comprises a red light source 101, a green light source 102 and a blue light source 103. In fact, for projection light source, not limited to the LED, laser light source is also possible, but the cost of laser matches that of single LCD projector, at this stage and for a long time in the future, it is almost impossible to balance the cost performance of products.

The collecting and collimating device comprises a red light collecting and collimating module for collecting and collimating the light emitted by the red light source 101, a green light collecting and collimating module for collecting and collimating the light emitted by the green light source 102, and a blue light collecting and collimating module for collecting and collimating the light emitted by the blue light source 103.

The red light collecting and collimating module, the green light collecting and collimating module, and the blue light collecting and collimating module comprise at least one lens. In this embodiment, preferably, but not limited to, the red light collecting and collimating module comprises an R collecting lens 211 and an R collimating lens 212 arranged in sequence according to the direction of light traveling; preferably, but not limited to, the green light collecting and collimating module comprises a G collecting lens 221 and a G collimating lens 222 arranged in sequence according to the direction of light traveling; preferably, but not limited to, the blue light collecting and collimating module comprises a B collecting lens 231 and a B collimating lens 232 arranged in sequence according to the direction of light traveling.

In this embodiment, the R collecting lens 211, the G collecting lens 221 and the B collecting lens 231 are preferable, but not limited to the three that have the same optical index, preferably but not limited to a concave-convex lens, and the concave surface is the incident surface; the R collimating lens 212, G collimating lens 222 and B collimating lens 232 are preferable but not limited to the three that have the same optical indicator, preferably, but not limited to biconvex lens, wherein the incident surface is a spherical surface, the outgoing surface is aspherical, and the material is preferable but not limited to E48R, in order to facilitate mass production as much as possible and maintain a high cost performance.

The focusing device focuses the image of the LED light source on or near the incident end face (or entrance) of the light-homogenizing device 6, thereby forming a real image of the secondary light source. It should be noted that, because the lens depth of the focusing device cannot be a plane, and the focusing device itself will always produce distortion such as aberration, and is combined with the actual production accuracy, it is impossible to absolutely and distortion-free focus on the incident end face of the light-homogenizing device 6. The number of lenses comprised in the focusing device is at least one. In this embodiment, preferably but not limited to, the focusing device comprises the first lens 51 and the second lens 52 to complete focusing imaging. How many lenses are actually used for focusing imaging, it depends on the positioning requirements of the projector for the optical system, such as cost and volume, etc.

After the light-homogenizing device 6 homogenizes the light of the real image of the secondary light source, the LCD light valve 8 is uniformly illuminated by the outgoing lens 7. In this embodiment, the light-homogenizing device 6 comprises a square-cone concentrator, and the outgoing lens 7 comprises at least one lens; the lens is preferable, but not limited to a plano-convex free-form face lens, wherein the plane is the incident surface, the outgoing face is a free-form surface.

Figure 3:
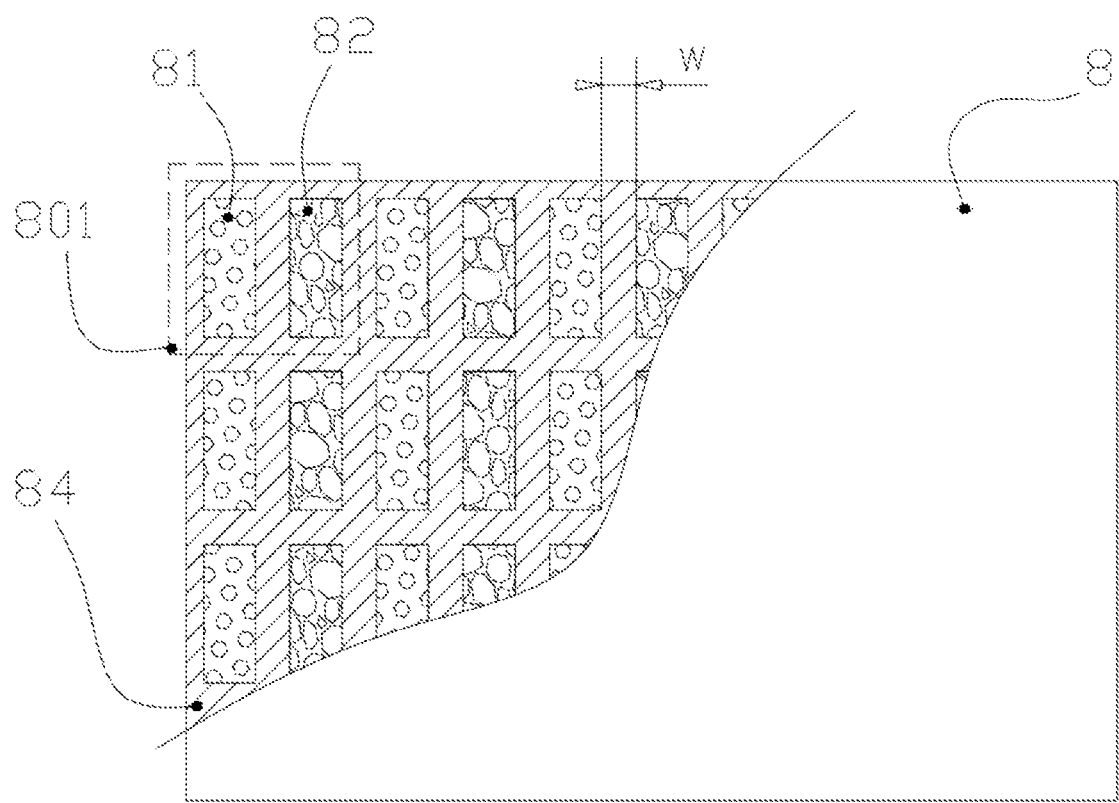
FIG. 3 is a schematic diagram of the LCD light valve pixel of the present disclosure.

Referring to FIG. 3, the LCD light valve 8 is a half-field sequential light valve with a single-base color color filter, and any pixel 801 of the LCD light valve 8 comprises two sub-pixels, which are the first sub-pixel 81 and the second sub-pixel 82 respectively; correspondingly, each frame of the full-color image inputting the LCD light valve 8 is decomposed into a red sub-frame, a green sub-frame and a blue sub-frame, that is, three-base color sub-frame images.

The first sub-pixel 81 is provided with a single-base color color filter (Color Filter, that is CF), and displays one sub-frame image with the same color as the color filter among the input full-color images. In this embodiment, preferably, but not limited to, the single-base color color filter of the first sub-pixel 81 is green, to complete the display of the green sub-frame image.

The second sub-pixel 82 does not have a color filter, and is pure black and white display, and alternately displays the other (or "another") two sub-frame images among the input full-color images by means of field sequence; correspondingly, in this embodiment, preferably, but not limited to, the second sub-pixel 82 alternately displays the red sub-frame and the blue sub-frame by means of field sequence.

Correspondingly, one of the LED light sources corresponding to the color of the color filter of the first sub-pixel 81, is selectively lit with a duty circle; in this embodiment, preferably, the green light source 102 corresponding to the green color filter, is selectively lit with a duty cycle.

Correspondingly, when the second sub-pixel 82 displays one of the other two sub-frame images by means of field sequence, one of the LED light sources corresponding the color, is selectively lit with a duty circle; when the second sub-pixel 82 displays the other one of the other two sub-frame images by means of field sequence, one of the LED light sources corresponding to the color, is selectively lit with a duty circle. In this embodiment, when the second sub-pixel displays a red sub-frame by means of field sequence, the red light source 101 is selectively and synchronously lit with a duty cycle; when the second sub-pixel 82 displays a blue sub-frame by means of field sequence, the blue light source 103 is selectively and synchronously lit with a duty cycle.

Figure 4:
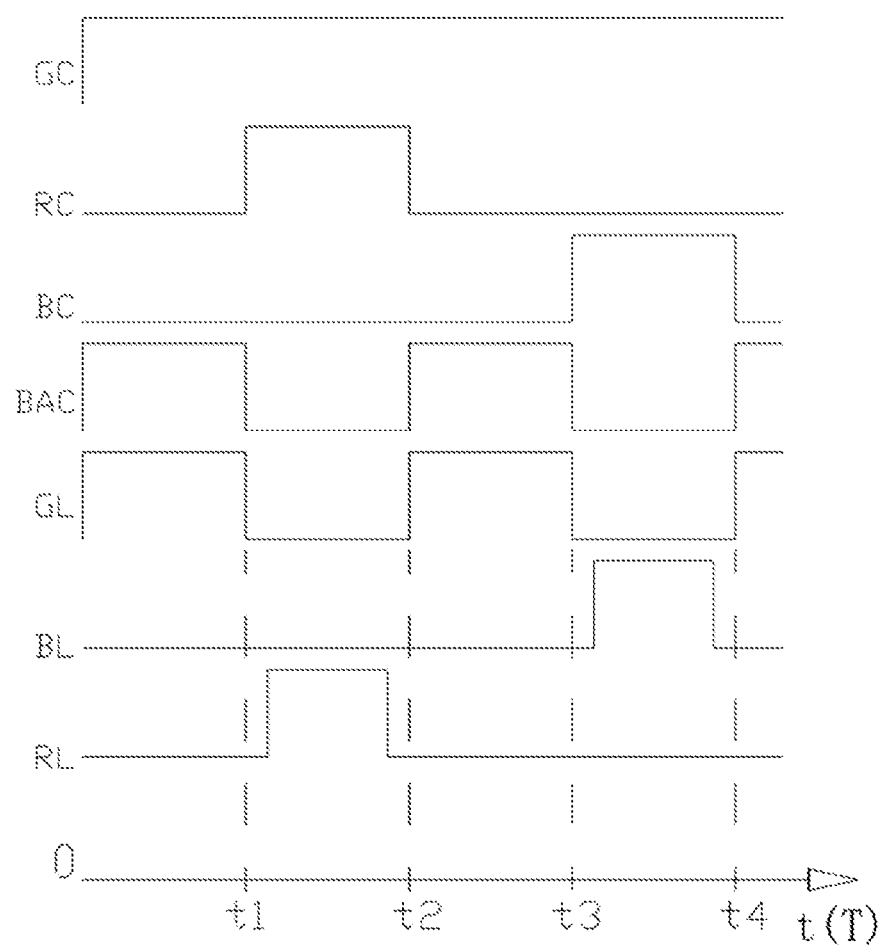
FIG. 4 is a schematic diagram of the signal duty cycle of an embodiment of the present disclosure.

Referring to FIG. 4, let the time-consuming displaying each frame of full-color image be T (the abscissa represents time t or T, and 0 represents t0), and T is divided into the first time period t1–t0 (here "-" does not mean "from t1 to t0", means t1 minus t0 or from t0 to t1, below is the same), the second time period t2–t1, the third time period t3–t2 and the fourth time period t4–t3, T=(t1–t0)+(t2–t1)+(t3–t2)+(t4–t3) =t4–t0, t4–t0 is the input T of a full-color image. Correspondingly, the first sub-pixel 81 displays one sub-frame at the time T; the second sub-pixel 82 alternately displays the other two sub-frames by means of field sequence within time T, respectively: the first time period t1–t0 is to insert a black field for the second sub-pixel 82, the second time period t2–t1 is to display one of the other two sub-frame images for the second sub-pixel 82, the third time period t3–t2 is to insert a black field for the second sub-pixel 82, and the fourth time period t4–t3 is to display the other one of the other two sub-frame images for the second sub-pixel 82. Referring to FIG. 4, in this embodiment, the display time of the green sub-frame image on the first sub-pixel 81 is T (referring to the green sub-frame switching pulse curve GC), while the red (referring to the red sub-frame switching pulse curve RC) and blue (referring to the blue sub-frame switching pulse curve BC), the two sub-frame images are alternately displayed on the second sub-pixel 82 by means of field sequence, respectively: the first time period t1–t0 is to insert a black field for the second sub-pixel 82 (referring to black field switching pulse curve BAC), the second time period t2–t1 is to display a red sub-frame image for the second sub-pixel 82 (referring to the pulse curve RC), the third time period t3–t2 is to insert a black field for the second sub-pixel 82 (referring to the pulse curve BAC), and the fourth time period t4–t3 is to display a blue sub-frame image for the second sub-pixel 82 (referring to the pulse curve BC).

Correspondingly, one of the LED light sources corresponding to the color of the color filter of the first sub-pixel 81, is selected to be correspondingly lit at the first time period t1–t0 and the third time period t3–t2. Referring to FIG. 4, in this embodiment, the green light source 102 is correspondingly lit at the first time period t1–t0 and the third time period t3–t2, and is not lit during the rest of the time T, referring to the green light source switching pulse curve GL in the drawings.

Correspondingly, when the second sub-pixel 82 displays one of the other two sub-frame images at the second time period t2–t1, one of the LED light sources corresponding to the color of one sub-frame image, is selected within the second time period t2–t1, to be lit at the time ≤t2–t1. Referring to FIG. 4, in this embodiment, when the second sub-pixel 82 displays a red sub-frame image at the second time period t2–t1, the red light source 101 is synchronously lit within the second time period t2–t1, and the value of the time selected to be lit <t2–t1, referring to the red light source switching pulse curve RL in the drawings.

Correspondingly, when the second sub-pixel 82 displays the other one of the other two sub-frame images at the fourth time period t4–t3, one of the LED light sources corresponding to the color of the other sub-frame image, is selected within the fourth time period t4–t3, to be lit at the time ≤t4–t3. Referring to FIG. 4, in this embodiment, when the second sub-pixel 82 displays a blue sub-frame image at the fourth time period t4–t3, the blue light source 103 is synchronously lit at the fourth time period t4–t3, and the value of time selected to be lit <t4–t3, referring to the blue light source switching pulse curve BL in the drawings. This is because even if black frame insertion is done to the second sub-pixel 82, it is still unfavorable and meaningless to lit the corresponding light source for irradiation during the extremely short time between the liquid crystal flipping at high speed and holding.

Furthermore, this embodiment completes the full-color display by means of half-field sequence, that is, the first sub-pixel 81 of the LCD light valve 8 displays a sub-frame image within the time T, such as the green sub-frame image, and the first sub-pixel does not have a field sequence mode, like the light valve of the existing full-color technology, it belongs to the "constant bright" display mode; while the second sub-pixel 82 displays the other two sub-frame images by means of field sequence, such as the red sub-frame and the blue sub-frame image, and the red sub-frame is displayed at the second time period t2–t1, the blue sub-frame is displayed at the fourth time period t4–t3, and the black field image is inserted at the first time period t1–t0 and the third time period t3–t2. Correspondingly, the green light source 102 is respectively lit at the first time period t1–t0 and the third time period t3–t2. While the red light source 101 is synchronously lit within the second time period t2–t1, but the value of time selected to be lit <t2–t1. Similarly, the blue light source 103 is synchronously lit within the fourth time period t4–t3, but the value of time selected to be lit <t4–t3.

Referring to FIG. 4, within the time T, the first sub-pixel 81 constantly displays the green sub-frame image, at this time, as long as the green light irradiates, the green sub-frame image can be output, projecting out through the field lens 9, the imaging reflector 10 and the projection lens 11. The green light source 102 is respectively lit at the first time period t1–t0 and the third time period t3–t2, and is extinguished during the rest time (referring to the pulse curve GL). Because the first sub-pixel 81 is constantly lit to display the green sub-frame image, green (nearby) is the most sensitive color for human eye, so the most sensitive one frame image is constantly lit without field sequential alternation, it creates objective condition for reducing the flicker sensation of the output image of field sequential single LCD projector. Meanwhile, compared with pure field sequential single LCD projector, the light source of the green image in this embodiment is lit once each at the first time period t1–t0 and the third time period t3–t2, which is also objectively and exponentially reduces the flicker sensation of the image caused by the alternation of light sources.

When the green light source 102 is lit at the first time period t1–t0 and the third time period t3–t2, the second sub-pixel 82 outputs a black field and is in a blocking state, so the green light will not be leaked out by the second sub-pixel 82, and the LCD light valve 8 only outputs the normal green sub-frame image.

Within the second time period t2–t1 of the time T, the second sub-pixel 82 displays a red sub-frame image, and correspondingly, the duty cycle of the red light source 101 is selectively and synchronously lit. At this time, in addition to illuminating the second sub-pixel 82, the red light source 101 also illuminates the first sub-pixel 81, but the first sub-pixel 81 has a green color filter, so when the red light illuminates the first sub-pixel 81, the red light will be completely blocked by the green CF, at this time, the LCD light valve 8 only outputs a pure red sub-frame image. Within the fourth time period t4–t3, the second sub-pixel 82 displays a blue sub-frame in a similar principle, and at this time, the LCD light valve 8 only outputs a pure blue sub-frame image. Furthermore, the new field sequential single LCD projector of this embodiment can complete full-color image display.

Continuing to refer to FIG. 3, the influence of BM (84 in the figure, namely Black Matrix, black matrix) on the transmittance of LCD light valve 8, has become more obvious in today's FHD resolution era, for example, taking BOE's 3.5-inch FHD light valve for example, the size of each pixel is about 40 μm*40 μm (micrometer), if the line width of BM ("W" in the FIG. 3) is 4 μm, then the pixel opening is [1−(40*4*2+32*4*2)/(40*40)]100%=64%. Referring to the existing full-color technology light valve in FIG. 10, any pixel 801' of the full-color LCD light valve 8' in the figure comprises the red color filter 81', the green color filter 82' and the blue color filter 83', between the color filters is BM (84' in the figure), under the same size condition, the pixel opening ratio is [1−(40*4*2+32*4*3)/(40*40)] 100%=56%, obviously, compared with the traditional full-color light valve technology, the pixel opening ratio is improved by about 14.3%, and the transmittance is accordingly improved.

Figure 10:
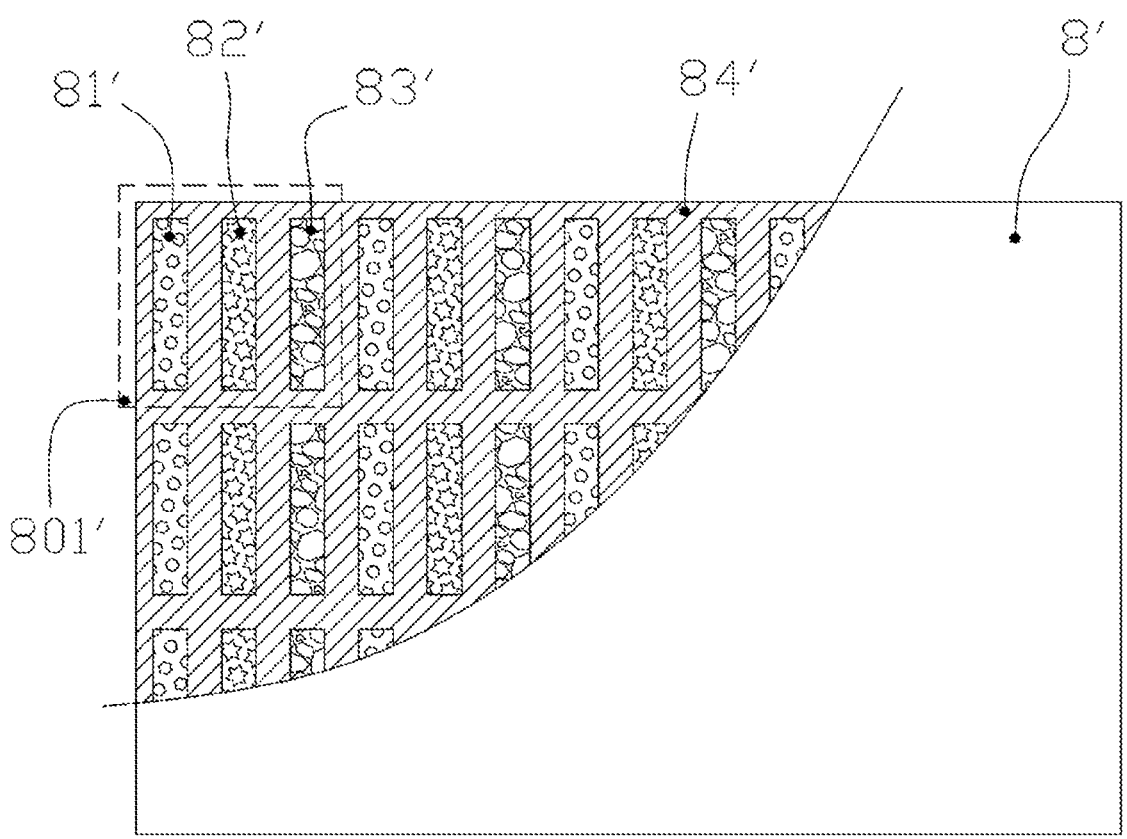
FIG. 10 is a schematic diagram of the existing full-color technology of the LCD light valve.

Continuing to refer to FIG. 10, under the condition that the white balance is basically normal, let the red light source illuminating the LCD light valve 8' be 1500 Lm (lumens), the power be 33 W, the green light source be 5000 Lm, the power be 53 W, the blue light source be 500 Lm, the power be 40 W, and the total be 7000 Lm, the power be 126 W, let the efficiency of the lighting system be 80%, the efficiency of polarized light be 40%, excluding the loss of field lens and lens, the CF (Color Filter) efficiency of the LCD light valve 8' be as high as 25%, then the projector can output:

7000*0.8*0.4*0.575*0.25=322 Lm.

Referring to FIG. 3, in this embodiment, under the same condition of maintaining the white balance, let T be divided into four equal parts, the red light source 101 be 750 Lm (a quarter of 3000 Lm), the power be 16.5 W, and the green light source 102 be 2500 Lm (one half of 5000 Lm), the power be 26.5 W, the blue light source 103 be 250 Lm (a quarter of 1000 Lm), the power be 20 W, the total be 3500 Lm, and the power be 63 W, then the projector can output:

5000*0.25*2+3000*0.25+1000*0.25)
*0.8*0.4*0.65*0.5=364 Lm.

Obviously, the power consumption of this embodiment is only half of that of the prior art, while the output brightness is higher, at the same time, the NTSC color gamut of the LCD light valve 8' of the prior art is about 50% (CF efficiency is as high as 25%), while the color gamut of the output image in this embodiment is at least >75%, and the user experience is fundamentally different. The power consumption and the level of heat dissipation and noise of the projector are significantly improved. In addition, the black level and contrast of the projector are also significantly contributed by black frame insertion.

Further, when black frame insertion is done between each sub-frame, the impacting time of the existing pure field sequential technology on the driving chip and the liquid crystal of the LCD light valve 8 than the present embodiment, is required to be at least 30-40% higher, for a driver up to 109 Hertz (GHz), 30% higher frequency means that power consumption, chip architecture, manufacturing process, memory capacity, etc., are fundamentally different, and the response time to the liquid crystal needs to reach about 2-3 ms, which is too difficult for specific implement. In this embodiment, even if the response time to the liquid crystal is 5-6 ms, it can also work normally, correspondingly, the response time to the liquid crystal is reduced from 5 ms to 3 ms, at present, the stable mass production technology of LCD light valves is still almost blank. Meanwhile, due to the effect of black frame insertion, the sub-pixel of alternating field sequence will no longer have a greater impact on the black and white falling time and gray-scale response time to the liquid crystal; while the sub-pixel with color filter (such as the first sub-pixel 81), its mechanism is the same as the existing full-color technology, and it belongs to a mature technology.

Of course, relative to the full-color display technology in FIG. 10, black frame insertion itself will significantly increase the bandwidth requirement of the driver chip, then between the red sub-frame, green sub-frame and blue sub-frame, and full-color frames, if black frame insertion is not done, and if it is better to control the lighting time interval of each color light source, the answer is negative. Although the lighting interval between the red light source 101, the green light source 102 and the blue light source 103 is widened, that is, the lighting time is shorter, theoretically, when the LCD light valve 10 does not display each color of sub-frame images normally (holding), the LED light source is not lit, the audience will not see abnormalities such as image smearing and ghosting, but this is not the case in reality, since its mechanism has no necessary connection with the present disclosure, it will not be described again.

Figure 5:
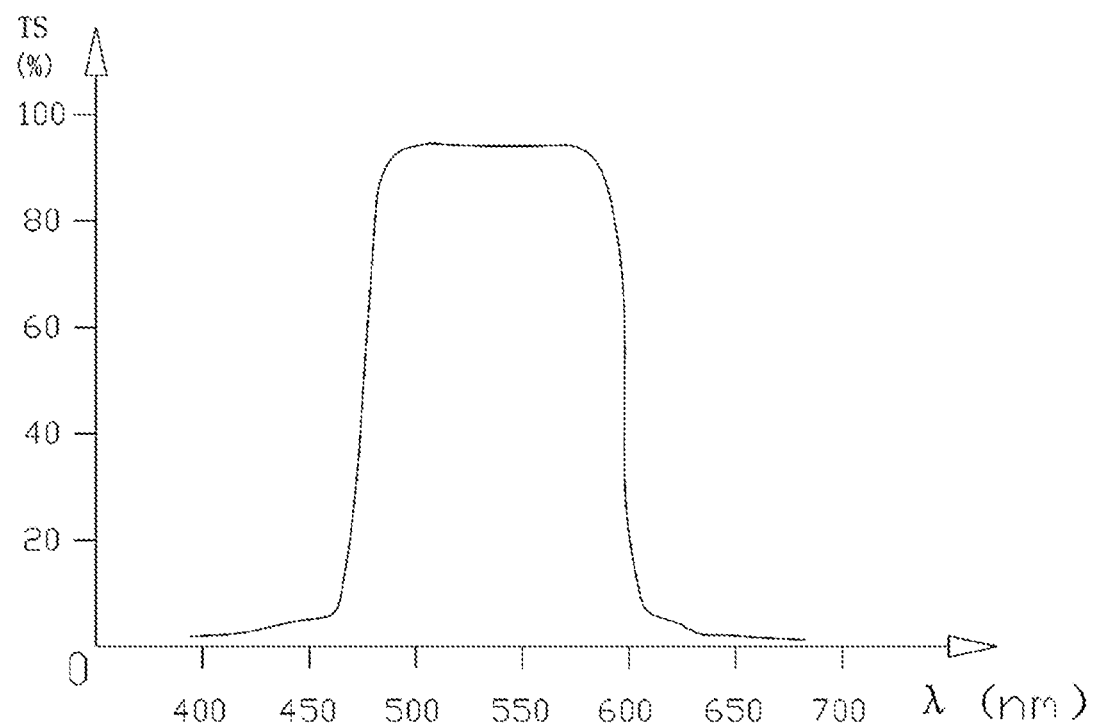
FIG. 5 is a schematic diagram of the color resistance curve of the LCD light valve of an embodiment of the present disclosure.

Referring to FIG. 5, the curve of the green color filter photoresist (also called color resistance, the industry does not strictly distinguish between "photoresist" and "color resistance") of the first sub-pixel 81 in this embodiment, has the wavelength of light transmission >485 nm and <585 nm, the wavelength of light blocking<465 nm and >605 nm, the light in the wavelength range of 465 nm to 485 nm, is correspondingly in a continuous transition state from blocking to transmission, and the light in the wavelength range of 585 nm to 605 nm, is correspondingly in a continuous transition state from blocking to transmission. In FIG. 5, TS represents the transmission efficiency, and λ represents the wavelength.

Figure 6:
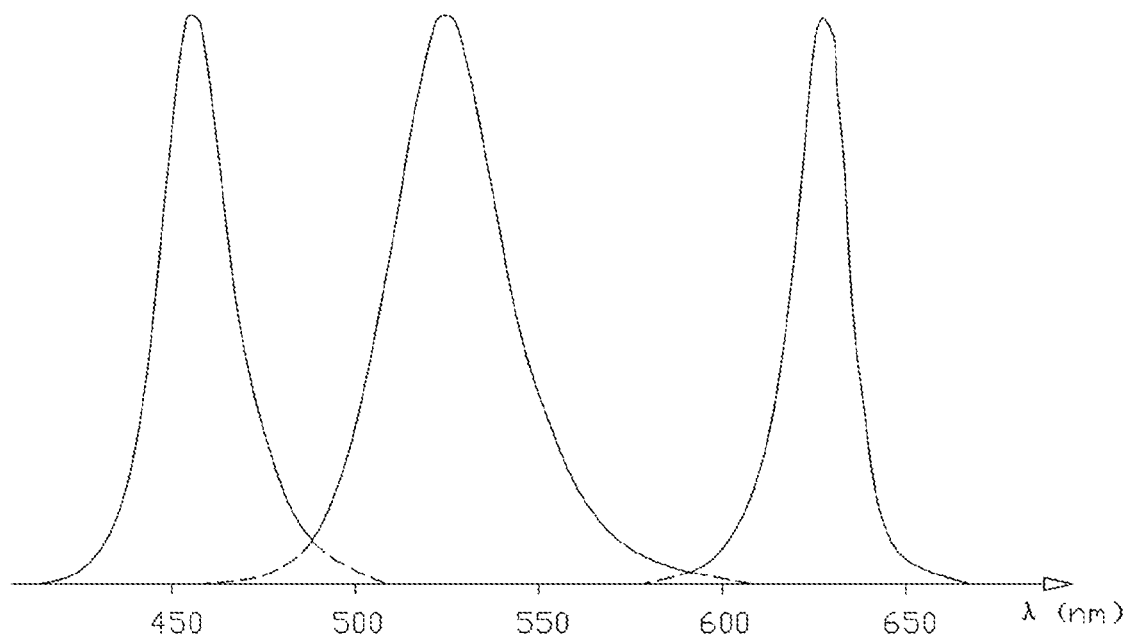
FIG. 6 is a schematic diagram of the spectral spectrum of the LED light source of the present disclosure.

Referring to FIG. 6, the schematic diagram of the spectral spectrum of the LED light source, after combining and filtering light through the light-combining and color-filtering device (there is no clear distinction between "combining light" and "combining color" for the industry term, although the serious definition is different, the process that produces the effect is similar.) the area of the local area surrounded by the two dotted lines and the abscissa in the figure must be ≤5% of the total area enclosed by the three-base color spectrum (solid line) and the abscissa in the figure. This is of great help to improve the color gamut, saturation, contrast and other indicators of the image, and at the same time, the loss of light energy is not large, which is an empirical value.

In this embodiment, the light-combining and color-filtering device comprises the BG dichroic plate 31 and the CR dichroic plate 32. The light-emitting surfaces of the green light source 102 and the blue light source 103 are preferable to be arranged orthogonally, and the BG dichroic plate 31 is preferable to locate between the light-emitting surfaces (or the corresponding optical axis) of the green light source 102 and the blue light source 103 at an angle of 45°, to combine the light of the green light source 102 and the blue light source 103 (referring to FIG. 1). The BG dichroic plate 31 transmits the blue light and reflects the green light, preferably but not limited to the transmission of light with a wavelength <465 nm, the reflection of light with a wavelength >485 nm, and the light with a wavelength range of 465 nm to 485 nm is correspondingly from 465 nm onwards, the transmittance is gradually decrease until 485 nm blocking, and the transmittance change is in a continuous transition state (closer to a linear transition state if made well) rather than a step state.

Figure 7:
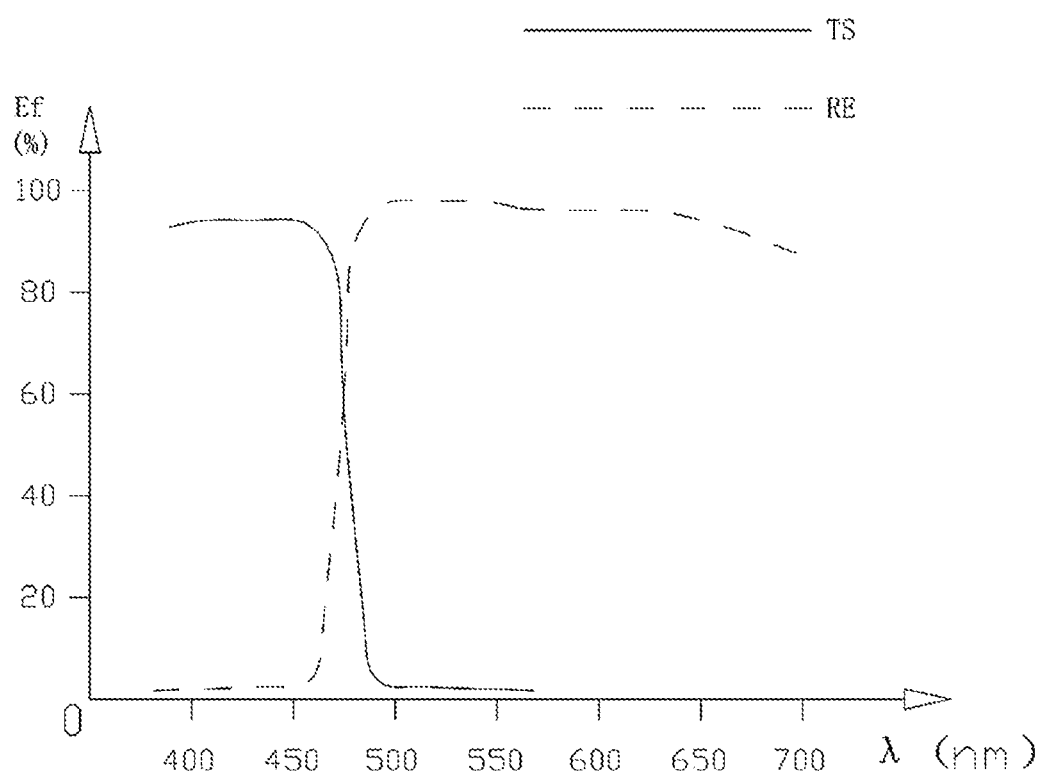
FIG. 7 is a schematic diagram of the 45° angular spectral spectrum of the BG dichroic plate of the present disclosure.
Figure 8:
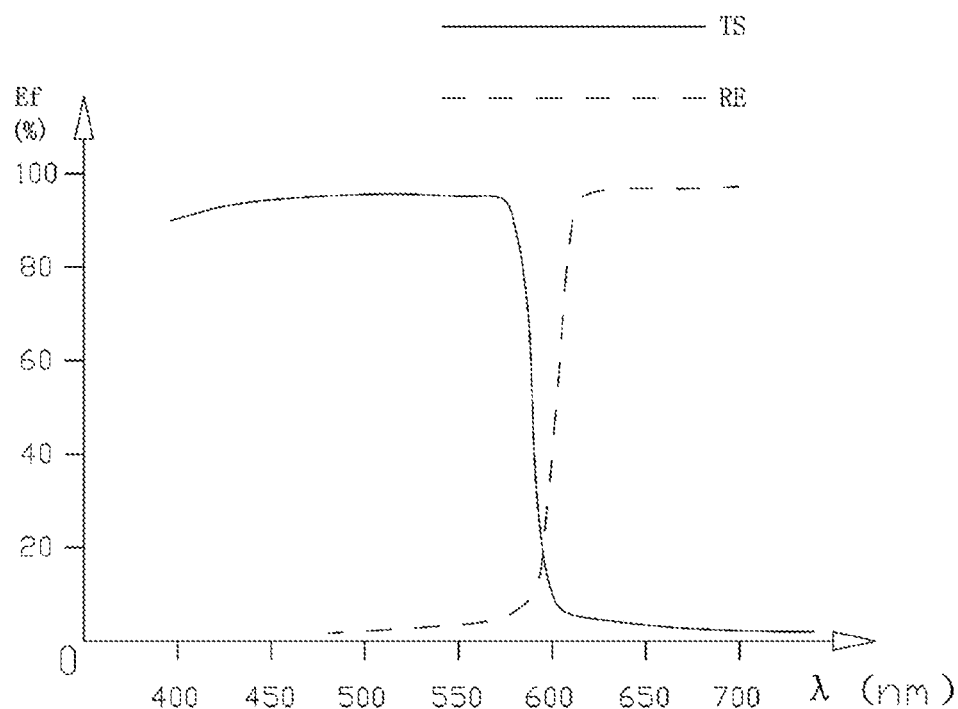
FIG. 8 is a schematic diagram of the 45° angular spectral spectrum of the CR dichroic plate of the present disclosure.

In this embodiment, the light-emitting surfaces of the red light source 101 and the green light source 102 are preferably arranged in parallel or coplanar, the CR dichroic plate 32 and the BG dichroic plate 31 are preferably arranged in parallel, the CR dichroic plate 32 is located between the light-emitting surfaces of the green light source 102 and the red light source 101 to combine light from the BG dichroic plate 31 and the red light source 101. The CR dichroic plate 32 transmits cyan light and reflects red light, preferably but not limited to the transmission of light with a wavelength <585 nm, the reflection of light with a wavelength >605 nm, and the light with a wavelength range of 585 nm to 605 nm, is correspondingly from 585 nm onwards, the transmittance decreases gradually until the 605 nm blocking, and the transmittance change was in a continuous transition state. The above refers to FIG. 7 and FIG. 8 in detail. In the figure, λ is the wavelength, TS is the transmission, Ef is the efficiency, and RE is the reflection. Considering the difficulty of coating, the CR dichroic plate 32 and the BG dichroic plate 31 are both selected to be arranged with the optical axis at an angle of 45°, if arranged at other angles (if the installation space allows or the size of the whole machine requires), the balance of transmission and reflection needs to be sacrificed as appropriate.

It must be noted that the above-mentioned dichroic color plate is usually standard on the DLP projector of the LED light sources, but it is an unprecedented design on the single LCD projector. At the same time, for DLP and single LCD projectors, the light-dividing (or light-combining) characteristics of the dichroic plate are different, in the present disclosure, when the green light source 102, especially when using phosphor powder-excited light source, needs to be actively filtered to meet the design requirement. While for the DLP projector, the main purpose of the light-combining device is to combine the light of the light source as efficiently as possible, because the DLP projector is an ideal pure field sequential working mode, and its white balance adjustment is much easier.

In this embodiment, the black field insertion for the second pixel 82 is a necessary measure to improve anomalies such as image smearing, ghosting, and blurring, etc. Before each sub-frame is displayed, the previous sub-frame displayed by the LCD light valve 8 is erased neatly, which is similar to using the De-mura technology on the LCD light valve, of course, this example is not appropriate. That is to say, before the dynamic grayscale of each sub-frame image of the field sequence may be superimposed incorrectly, and a scientific and efficient algorithm cannot be found to obtain an accurate "holding value", erasing and re-displaying the image are the most effective means to achieve correct display.

To a certain extent, by adjusting the different time or duty cycle of the first time period t1–t0, second time period t2–t1, third time period t3–t2 and fourth time period t4–t3, it is possible to present much color gamut, white balance and output brightness selection.

Embodiment 2

Obviously, engineering implementation is extremely difficult for the pure field sequential display technology of RGB sequential switching. Therefore, in recent years, people have invented display technology such as dual field sequence and multi-field sequence, referring to the technology in Chinese Patent Publication No. CN104112436A and CN104134431A. Unfortunately, it is still not possible to put these products into practical use, especially for the single LCD projector.

Referring to FIG. 1-3, FIG. 9 and the first embodiment, the difference between this embodiment and the first embodiment is that any pixel 801 of the LCD light valve 8 comprises two black and white sub-pixels, which are respectively the first sub-pixel 81 and the second sub-pixel 82; correspondingly, each frame of the full-color image inputting the LCD light valve 8 is decomposed into three-base color sub-frame images: red sub-frame, green sub-frame and blue sub-frame.

The first sub-pixel 81 displays one of three-base color sub-frame images. In this embodiment, preferably, but not limited to, the first sub-pixel 81 displays the green sub-frame image.

Correspondingly, the second sub-pixel 82 alternately displays the other two of three-base color sub-frame images by means of field sequence. In this embodiment, preferably, but not limited to, the second sub-pixels 82 alternately displays the red sub-frame and the blue sub-frame by means of field sequence.

Correspondingly, one of the LED light sources corresponding to the display color of the first sub-pixel 81, is selectively lit with a duty cycle.

Correspondingly, when the second sub-pixel 82 displays one of the other two sub-frames by means of field sequence, one of the LED light sources corresponding to the color is selectively lit with a duty circle; when the second sub-pixel 82 displays the other one of the other two sub-frames by means of field sequence, one of the LED light sources corresponding to the color is selectively lit with a duty circle. In this embodiment, when the second sub-pixel 82 displays a red sub-frame by means of field sequence, the red light source 101 is selectively lit with a duty cycle; when the second sub-pixel 82 displays a blue sub-frame by means of field sequence, the blue light source 103 is selectively lit with a duty circle.

Figure 9:
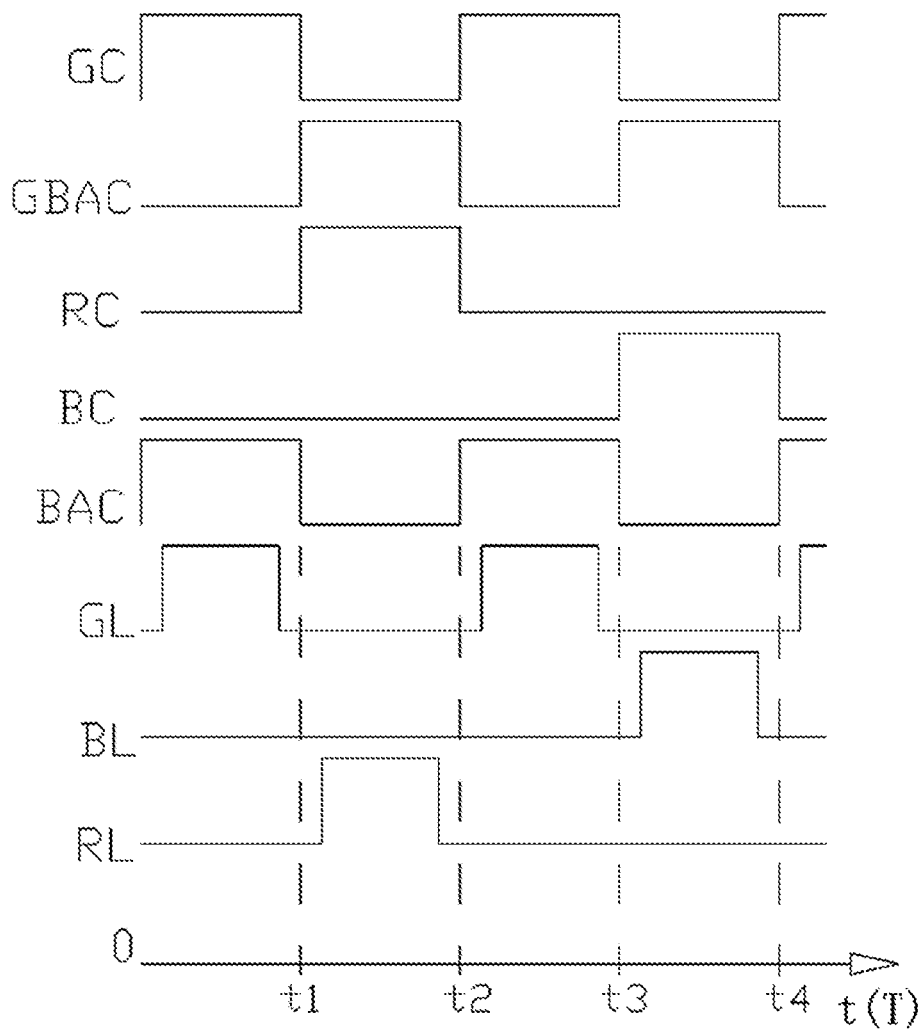
FIG. 9 is a schematic diagram of the signal duty cycle of another embodiment of the present disclosure.

Further, let the time-consuming displaying each frame of three-base color full-color image be T, and T is divided into the first time period t1–t0, the second time period t2–t1, the third time period t3–t2 and the fourth time period t4–t3, then T=(t1–t0)+(t2–t1)+(t3–t2)+(t4–t3)=t4–t0. Correspondingly, the first sub-pixel (81) displays one of three sub-frame images at the first time period t1–t0 and the third time period t3–t2, and at the second time period t2–t1 and the fourth time period t4–t3 inserts a black field; correspondingly, the second sub-pixel 82 alternately displays the other two sub-frame images by means of field sequence within the time T, which are respectively: the first time period t1–t0 is to insert a black field for the second sub-pixel 82, the second time period t2–t1 is to display one of the other two sub-frame images for the second sub-pixel 82, and the third time period t3–t2 is to insert a black field for the second sub-pixel 82, and the fourth time period t4–t3 is to display the other one of the other two sub-frame images for the second sub-pixel 82. Referring to FIG. 9, in this embodiment, the first sub-pixel 81 displays the green sub-frame image at the first time period t1–t0 and the third time period t3–t2 (referring to the GC pulse curve in FIG. 9), a black field is inserted at the second time period t2–t1 and the fourth time period t4–t3 (referring to the GBAC pulse curve); correspondingly, a black field is inserted for the second sub-pixel 82 at the first time period t1–t0 (referring to the BAC pulse curve), the second sub-pixel 82 displays the red sub-frame image at the second time period t2–t1 (referring to the RC pulse curve), a black field is inserted for the second sub-pixel 82 at the third time period t3–t2 (referring to the BAC pulse curve), and the second sub-pixel 82 displays the blue sub-frame image at the fourth time period t4–t3 (referring to the BC pulse curve).

Correspondingly, the green light source 102 of the LED light sources corresponding to the color of the green sub-frame image displayed by the first sub-pixel 81, is selected to be correspondingly lit at the first time period t1–t0 and the third time period t3–t2 (referring to the GL pulse curve); in this embodiment, the green light source 102 is correspondingly lit at the time <t1–t0 and <t3–t2, and is not lit at the rest time of T.

In this embodiment, when the second sub-pixel 82 displays the red sub-frame image at the second time period t2–t1, the red light source 101 is synchronously lit at the second time period t2–t1, and the lighting time is less than the value of t2–t1. When the second sub-pixel 82 displays the blue sub-frame image at the fourth time period t4–t3, the blue light source 103 is synchronously lit at the fourth time period t4–t3, but the lighting time is less than the value of t4–t3.

Obviously, because the LCD light valve is different in this embodiment, the lighting time of the LED light sources is also different, and the requirement for the driving chip of the LCD light valve is also different. On one hand, the difficulty of driving the first sub-pixel 81 is increased, and the cost is increased; on the other hand, in the front-end circuitry, if the two sub-frames of the same color inputting the first subpixel 81 are processed by memory means, the clarity of the projector can be completely enhanced (showing more amount of information); since the LCD light valve 8 does not have CF, the production cost can be reduced to a certain extent.

Embodiment 3

The projection method of a new field sequential single LCD projector provided by this embodiment comprises the following steps:

The red light source 101, the green light source 102 and the blue light source 103 emit light respectively, the red light collecting and collimating module collects and collimates the light emitted by the red light source 101, and the green light collecting and collimating module collects and collimates the light emitted by the green light source 102, and the blue light collecting and collimating module collects and collimates the light emitted by the blue light source 103.

The light-combining and color-filtering device combines and filters the light emitted by the red light collecting and collimating module, the green light collecting and collimating module, and the blue light collecting and collimating module, and then, after being reflected by the intermediate reflector 4 and focused by the focusing device in sequence, the image of the LED light source is focused on or near the incident end face of the light-homogenizing device 6, thereby forming a real image of the secondary light source; after the light of the real image of the secondary light source is homogenized, the LCD light valve 8 is uniformly illuminated by the outgoing lens 7, and projected out through the field lens 9, imaging reflector 10 and projection lens 11 in sequence.

In this embodiment, the first sub-pixel 81 of the LCD light valve 8 displays one of three-base color sub-frame images; correspondingly, one of the LED light sources corresponding to the color of the sub-frame displayed by the first subpixel 81, is selectively lit with a duty cycle; the second sub-pixel 82 alternately displays the other two sub-frame images by means of field sequence, correspondingly, two of the LED light sources corresponding to the color of the other two sub-frame images, and the two sub-frame images alternately displayed by the second sub-pixels 82 correspond to synchronously alternate, and the duty cycle is selectively lit.

Further, the area ratio δ of the first sub-pixel 81 and the second sub-pixel 82 occupied in any one pixel is as follows:

$$\delta = S_{81}/S_{82}.$$

$$\delta = f(\Phi_{81}, \Phi_{821}, \Phi_{822}).$$

Wherein: $S_{81}$ is the area of the first sub-pixel 81; $S_{82}$ is the area of the second sub-pixel 82; $\Phi_{81}$ is the luminous flux provided for the first sub-pixel 81; $\Phi_{821}$ is the luminous flux provided when the second sub-pixel 82 displays one sub-frame image of the other two-base color by means of field sequence; $\Phi_{822}$ is the luminous flux provided when the second sub-pixel 82 displays the other one sub-frame image of the other two-base color by means of field sequence.

Further, the $\Phi_{81}$, $\Phi_{821}$, $\Phi_{822}$, the relationship between the time-consuming T of each full-color image and the opto-electronic characteristics of the LED light source is as follows:

$$\Phi_{81} = f\{[\beta(\Phi_R, \Phi_G, \Phi_B)], \Delta t_a, \Delta t_c\};$$

$$\Phi_{821} = f\{[\beta(\Phi_R, \Phi_G, \Phi_B)], \Delta t_b\};$$

$$\Phi_{822} = f\{[\beta(\Phi_R, \Phi_G, \Phi_B)], \Delta t_d\};$$

Wherein: β represents the mathematical meaning of "belonging to one of them" or "the corresponding one of them", that is, only calculate the photoelectric characteristics of a light source corresponding to the display color of the first sub-pixel 81 in the $\Phi_R$, $\Phi_G$, $\Phi_B$, the following is the same; $\Phi_R$ is the photoelectric characteristic of the red light source 101; $\Phi_G$ is the photoelectric characteristic of the green light source 101; $\Phi_B$ is the photoelectric characteristic of the blue light source 103; $\Delta t_a$ is related to the first time period t1–t0, that is, the proportion or duty cycle at the first time period t1–t0; $\Delta t_b$ is related to the second time period t2–t1, that is, the proportion or duty cycle at the second time period t2–t1; $\Delta t_c$ is related to the third time period t3–t2, that is, the proportion or duty cycle at the third time period t3–t2; $\Delta t_d$ is related to the fourth time period t4–t3, that is, the proportion or duty circle at the fourth time period t4–t3.

The mathematical model established by this method can accurately evaluate the reasonable value of the $S_{81}$ and $S_{82}$, thereby lays a scientific and feasible foundation for the specific implementation.

The foregoing has shown and described the basic principle, main features and advantage of the present disclosure. It should be understood by the technician in the art that the present disclosure is not limited by the above-mentioned embodiments, the above-mentioned embodiments and description only illustrate the principle of the present disclosure, the disclosure will have various variations and improvements without departing from the spirit and scope of the disclosure, such variations and improvements all fall within the scope of the claimed disclosure. The claimed scope of the present disclosure is defined by the appended claims and the equivalents.

What is claimed is:

1. A new field sequential single LCD projector, wherein comprises an LED light source, a collecting and collimating device, a light-combining and color-filtering device, an intermediate reflector (4), a focusing device, a light-homogenizing device (6), an outgoing lens (7), an LCD light valve (8), a field lens (9), an imaging reflector (10) and a projection lens (11);

the LED light source comprises a red light source (101), a green light source (102) and a blue light source (103);

the collecting and collimating device comprises a red light collecting and collimating module for collecting and collimating the light emitted by the red light source (101), a green light collecting and collimating module for collecting and collimating the light emitted by the green light source (102), and a blue light collecting and collimating module for collecting and collimating the light emitted by the blue light source (103); the red light collecting and collimating module, the green light collecting and collimating module, and the blue light collecting and collimating module all comprise at least one lens;

the light-combining and color-filtering device combines and filters the light emitted by the red light collecting and collimating module, the green light collecting and collimating module and the blue light collecting and collimating module; the focusing device focuses the image of the LED light source on the incident end face of the light-homogenizing device (6), thereby forming a real image of a secondary light source; the focusing device comprises at least one lens; after the light of the real image of the secondary light source is homogenized by the light-homogenizing device (6), the LCD light valve (8) is uniformly illuminated by the outgoing lens (7);

the LCD light valve (8) is a half-field sequential display light valve with a single-base color color filter, and any pixel (801) of the LCD light valve (8) comprises two sub-pixels, which are the first sub-pixel (81) and the second sub-pixel (82); correspondingly, each frame of the full-color image inputting the LCD light valve (8) is decomposed into three-base color sub-frame images: red sub-frame, green sub-frame and blue sub-frame;

the first sub-pixel (81) is provided with a single-base color color filter, and displays one of three-base color sub-frame images with the same color as the color filter;

the second sub-pixel (82) has no color filter, and alternately displays the other two of three-base color sub-frame images by means of field sequence;

correspondingly, one of the LED light sources corresponding to the color of the color filter of the first sub-pixel (81), is selectively lit with a duty circle;

correspondingly, when the second sub-pixel (82) displays one of the other two sub-frame images by means of field sequence, the light source of the LED light sources corresponding to the color, is selectively lit with a duty cycle; and correspondingly, when the second sub-pixel (82) displays the other one of the other two sub-frame images by means of field sequence, the light source of the LED light sources corresponding to the color, is selectively lit with a duty cycle.

2. The new field sequential single LCD projector according to claim 1, wherein let the time-consuming displaying each frame of full-color image be T, and T is divided into the first time period t1–t0, the second time period t2–t1, the third time period t3–t2 and the fourth time period t4–t3, then T=(t1–t0)+(t2–t1)+(t3–t2)+(t4–t3)=t4–t0; correspondingly, the first sub-pixel (82) displays one sub-frame image within the time T;

the second sub-pixel (82) alternately displays the other two sub-frame images by means of field sequence within the time T, respectively: the first time period t1–t0 is to insert a black field for the second sub-pixel (82), the second time period t2–t1 is to display one of the other two sub-frame images for the second sub-pixel (82), and the third time period t3–t2 is to insert a black field for the second sub-pixel (82), the fourth time period t4–t3 is to display the other one of the other two sub-frame images for the second sub-pixel (82);

correspondingly, one of the LED light sources corresponding to the color of the color filter of the first sub-pixel (81) is selected to be correspondingly lit within the first time period t1–t0 and the third time period t3–t2;

correspondingly, when the second sub-pixel (82) displays one of the other two sub-frame images at the second time period t2–t1, one of the LED light sources corresponding to the color of one sub-frame image, is selected within the second time period of t2–t1, to be lit at the time≤t2–t1;

correspondingly, when the second sub-pixel (82) displays the other one of the other two sub-frame images at the fourth time period t4–t3, one of the LED light sources corresponding to the color of the other one sub-frame image, is selected within the fourth time period of t4–t3, to be lit at the time≤t4–t3.

3. The new field sequential single LCD projector according to claim 1, wherein the LCD light valve (8) is a black and white type of half-field sequential display light valve, and any pixel (801) of the LCD light valve (8) comprises two black and white sub-pixels, which are respectively a first sub-pixel (81) and a second sub-pixel (82);

correspondingly, each frame of the full-color image inputting the LCD light valve (8) is decomposed into three-base color sub-frame images: red sub-frame, green sub-frame and blue sub-frame;

let the time-consuming displaying each frame of the full-color image be T:

the first sub-pixel (81) selectively displays one of three-base color sub-frame images within the T;

correspondingly, the second sub-pixel (82) alternately displays the other two of three-base color sub-frame images by means of field sequence within the T;

correspondingly, one of the LED light sources corresponding to the color of one sub-frame mage displayed by the first sub-pixel (81), is selectively lit with a duty circle;

correspondingly, when the second sub-pixel (82) displays one of the other two sub-frame images by means of field sequence, the light source of the LED light sources corresponding to the color of one sub-frame image, is selectively lit with a duty circle;

correspondingly, when the second sub-pixel (82) displays the other one of the other two sub-frame images by mean of field sequence, the light source of the LED light sources corresponding to the color of the other sub-frame image, is selectively lit with a duty circle.

4. The new field sequential single LCD projector according to claim 3, wherein let T be divided into the first time period t1–t0, the second time period t2–t1, the third time period t3–t2 and the fourth time period t4–t3, then T=(t1–t0)+(t2–t1)+(t3–t2)+(t4–t3)=t4–t0;

correspondingly, the first sub-pixel (81) displays one of three-base color sub-frames at the first time period t1–t0 and the third time period t3–t2, and inserts a black field at the second time period t231 t1 and the fourth time period t4–t3;

correspondingly, the second sub-pixel (82) alternately displays the other two-base color sub-frame images by means of field sequence within the T, respectively: the first time period t1–t0 is to insert a black field for the second sub-pixel (82), the second time period t2–t1 is to display one of the other two-base color sub-frame images for the second sub-pixel (82), the third time period t3–t2 is to insert a black field for the second sub-pixel (82), and the fourth time period t4–t3 is to display the other one of the other two-base color sub-frame images for the second sub-pixel (82);

correspondingly, one of the LED light sources corresponding to the color of a one-base color sub-frame image displayed by the first sub-pixel (81), is selected within the first time period t1–t0 and the third time period t3–t2, to be correspondingly lit at the time$\geq$1–t0 and $\leq$t3–t2;

correspondingly, when the second sub-pixel (82) displays one of the other two-base color sub-frame images at the second time period t2–t1, one of the LED light sources corresponding to the color of one sub-frame image, is selected within the second time period, to be lit at the time $\leq$t2–t1;

correspondingly, when the second sub-pixel (82) displays the other one of the other two-base color sub-frames at the fourth time period t4–t3, one of the LED light sources corresponding to the color of the other one sub-frame image, is selected within the fourth time period t4–t3, to be lit at the time $\leq$t4–t3.

5. The new field sequential single LCD projector according to claim 1, wherein the light-combining and color-filtering device comprises a BG dichroic plate (31) and a CR dichroic plate (32);

the light-emitting surfaces of the green light source (102) and the blue light source (103) are not parallel and not coplanar with each other; the BG dichroic plate (31) is located between the light-emitting surfaces of the green light source (102) and the blue light source (103), and combines light from the green light source (102) and the blue light source (103);

the light-emitting surfaces of the red light source (101) and the green light source (102) are parallel, coplanar, non-parallel or non-coplanar with each other;

the CR dichroic plate (32) combines light from the BG dichroic (31) and the red light source (101).

6. The new field sequential single LCD projector according to claim 1, wherein the light emitted by the light-combining and color-filtering device has: the spectral spectra of red, green and blue light do not overlap with each other, and the light-combining and color-filtering device outputs pure three-base color light;

the overlapping spectra are filtered and blocked by the light-combining and color-filtering device.

7. The new field sequential single LCD projector according to claim 1, wherein the light emitted by the light-combining and color-filtering device has: the wavelength range of the spectral spectra of red, green and blue light overlapping with each other$\leq$50 nm, and the area of the overlapping region with each other$\leq$5% of the spectral enclosing area of the light emitted by the light-combining and color-filtering device;

the overlapping spectral wavelength>50 nm, the area of the overlapping region with each other >5% of the spectral enclosing area of the light emitted by the light-combining and color-filtering device, which will be filtered and blocked by the light-combining and color-filtering device.

8. The new field sequential single LCD projector according to claim 1, wherein the red light collecting and collimating module comprises an R collecting lens (211) and an R collimating lens (212) arranged in sequence according to the light travelling direction;

the green light collecting and collimating module comprises a G collecting lens (221) and a G collimating lens (222) arranged in sequence according to the light travelling direction;

the blue light collecting and collimating module comprises a B collecting lens (231) and a B collimating lens (232) arranged in sequence according to the light traveling direction.

9. The new field sequential single LCD projector according to claim 1, wherein the light-homogenizing device comprises a square-cone concentrator (6).

10. The new field sequential single LCD projector according to claim 1, wherein the outgoing lens (7) comprises at least one lens, the lens adopts a plano-convex free-form surface lens, the plane of the plano-convex free-form surface lens is an incident surface, and the outgoing surface of the plano-convex free-form surface lens is a free-form surface.

* * * * *